United States Patent [19]
Ohtake et al.

[11] Patent Number: 5,973,814
[45] Date of Patent: Oct. 26, 1999

[54] OPTICAL DOCUMENT SCANNING METHOD AND APPARATUS WITH ADJUSTABLE SCANNING MAGNIFICATION

[75] Inventors: Motoyuki Ohtake, Kawasaka; Satoru Yoshizawa, Mitaka, both of Japan

[73] Assignee: Nikon Corporation, Tokyo, Japan

[21] Appl. No.: 09/004,828

[22] Filed: Jan. 9, 1998

[30] Foreign Application Priority Data

Jan. 10, 1997 [JP] Japan .................................... 9-014546

[51] Int. Cl.$^6$ .................................................. G02B 26/08
[52] U.S. Cl. ............................. 359/210; 358/474; 355/55
[58] Field of Search ................................... 359/210, 209; 355/55–63; 358/474, 483

[56] References Cited

U.S. PATENT DOCUMENTS

| | | |
|---|---|---|
| 4,531,831 | 7/1985 | Kitajima et al. ........................... 355/57 |
| 4,922,087 | 5/1990 | Nakajima et al. ..................... 250/201.4 |
| 5,048,106 | 9/1991 | Nakajima et al. .......................... 355/55 |
| 5,585,937 | 12/1996 | Kokubo et al. ........................... 358/474 |

*Primary Examiner*—James Phan
*Attorney, Agent, or Firm*—Michael N. Meller; Eugene Lieberstein

[57] ABSTRACT

An optical document scanning method and apparatus having a driving system which drives each of the lens groups collectively forming the optical scanning apparatus in an optical axis direction to lens positions corresponding to a given designed-scanning magnification; and a detecting system which detects the actual scanning magnification of the optical scanning system at the lens positions corresponding to the given designed-scanning magnification, whereby to substantially match the actual scanning magnification to the given designed-scanning magnification, the driving system drives each of the lens groups in the optical axis direction by a given amount corresponding to any difference between the actual scanning magnification and the given designed-scanning magnification.

15 Claims, 14 Drawing Sheets

OPTICAL DOCUMENT SCANNING METHOD AND APPARATUS WITH ADJUSTABLE SCANNING MAGNIFICATION

The present invention relates to an optical scanning method and apparatus. More particularly, the present invention relates to an optical document scanning method and apparatus in which scanning magnification is adjustable.

BACKGROUND OF THE INVENTION

An optical document scanning system is used, for example, to input information on a document as image information to a computer. In an optical document scanner, a document image is formed on a solid-state image pick-up device having a photoelectric conversion action, such as a CCD sensor, via the optical scanning system so that the document image is inputted as electrical information to the computer.

Optical scanning systems in use today have a fixed magnification. Nevertheless, optical scanning systems with a variable scanning magnification similar to a photography system used for cameras would be more useful. For example, an optical system having a variable scanning magnification using a variable focal length lens system with more than two movable lenses is described in Japanese Laid Open Patent S54-78150.

In general, each of the lenses forming an optical system is manufactured with some errors (tolerances) in its radius of curvature, lens thickness, distance between lenses, refractive index, and dispersion in relation to desired design values. Hence, in a zoom lens having variable focal lengths, errors in focal length and distance between principal points of each of the lens groups comprising the optical system have occurred. When each lens group is moved along a given path so that the focal length changes with a constant image position, the focal point of the lens groups will vary with respect to the optical axis due to the above-mentioned manufacturing errors. Therefore, it is necessary to adjust the focal point of an optical system to a predetermined position during the manufacturing processes. This is usually called an adjustment of back focus. Adjustment of back focus is described in Japanese Laid Open Patent H1-201633.

However, with a zoom lens adjusted for back focus as shown in Japanese Laid Open Patent H1-201633, the actual focal point deviates from the given design focal point when each lens group is moved to lens positions corresponding to a given design focal point. In an optical scanning system, a conjugate length between a document being scanned and an image surface is a definite distance. Therefore, the deviation of the actual focal point from the given design focal point means that the actual scanning magnification does not match the given design scanning magnification. The conclusion is that a document cannot be scanned at a desired design magnification in a document scanning apparatus which has an optical scanning system adjusted for back focus during the manufacturing processes.

SUMMARY OF THE INVENTION

It is accordingly an object of the present invention to provide an optical document scanning method and apparatus with variable scanning magnification in which a document can be accurately scanned at a desired design scanning magnification.

It is a further object of the present invention to provide an optical document scanning apparatus which in a preferred embodiment has a variable scanning magnification and wherein an image of a document is formed on an image sensor. Such apparatus includes a plurality of lens groups arranged along an optical axis for receiving light beams from the document and focusing such beams on the image sensor. A driving system is included for moving the lens groups along the optical axis to preselected lens positions corresponding to a given designed scanning magnification for the scanning apparatus. Also included is a detector for detecting the actual scanning magnification of the scanning apparatus at the preselected lens positions. Then the driving system moves each of the lens groups by an amount corresponding to the difference between the detected actual scanning magnification and the given designed scanning magnification.

In a further preferred embodiment, the scanning apparatus has a reference mark with a preselected spatial relationship with the document. The detector which detects the actual scanning magnification utilizes an image of the reference mark formed by the scanning apparatus.

In another preferred embodiment, the detector of the scanning apparatus detects the actual scanning magnification based on an image of the reference mark formed on the image sensor by means of the lens groups.

A preferred method incorporating the principles of the present invention for varying the scanning magnification of an optical document scanning apparatus, wherein an image of a document is formed on an image sensor includes the steps of arranging a plurality of lens groups of the scanning apparatus along an optical axis for receiving light beams from the document and focusing the beams on the image sensor. The lens groups are moved along the optical axis to preselected lens positions corresponding to a given designed scanning magnification for the scanning apparatus. The next step is the detection of the actual scanning magnification of the scanning apparatus at the preselected lens positions. Any difference between the detected actual scanning magnification and the given designed scanning magnification is determined and each of the lens groups are moved to new lens position determined by such difference.

In the apparatus incorporating the principles of the present invention each of the lens groups forming a optical scanning system is driven in the optical axis direction to a lens position corresponding to a given design scanning magnification via a driving system. Also, a detecting system detects an actual scanning magnification of the optical scanning system at the lens position corresponding to the given design scanning magnification. As discussed previously, due to manufacturing errors, the actual scanning magnification detected by the detecting system may differ from the given design scanning magnification. In the method and apparatus incorporating the principles of the present invention, therefore, each of the lens groups is driven by the driving system in the optical axis direction by a given amount corresponding to any difference between the actual scanning magnification and the given design scanning magnification, such that the actual scanning magnification substantially matches the given design scanning magnification.

In the method and apparatus incorporating the principles of the present invention, as shown above, scanning magnification is adjusted so that the actual scanning magnification detected by the detecting system substantially matches the given design scanning magnification. This differs from the conventional back focus adjustment in manufacturing processes of zoom lenses for cameras. Thus, a document can be accurately scanned at a desired design scanning magnification in spite of relatively low accuracy in origin detection.

BRIEF DESCRIPTION OF THE DRAWINGS

The above and other objects, features, and advantages of the present invention will become more apparent from the following detailed description taken with the accompanying drawings, in which.

DESCRIPTION OF THE PREFERRED EMBODIMENTS

Figure 1:
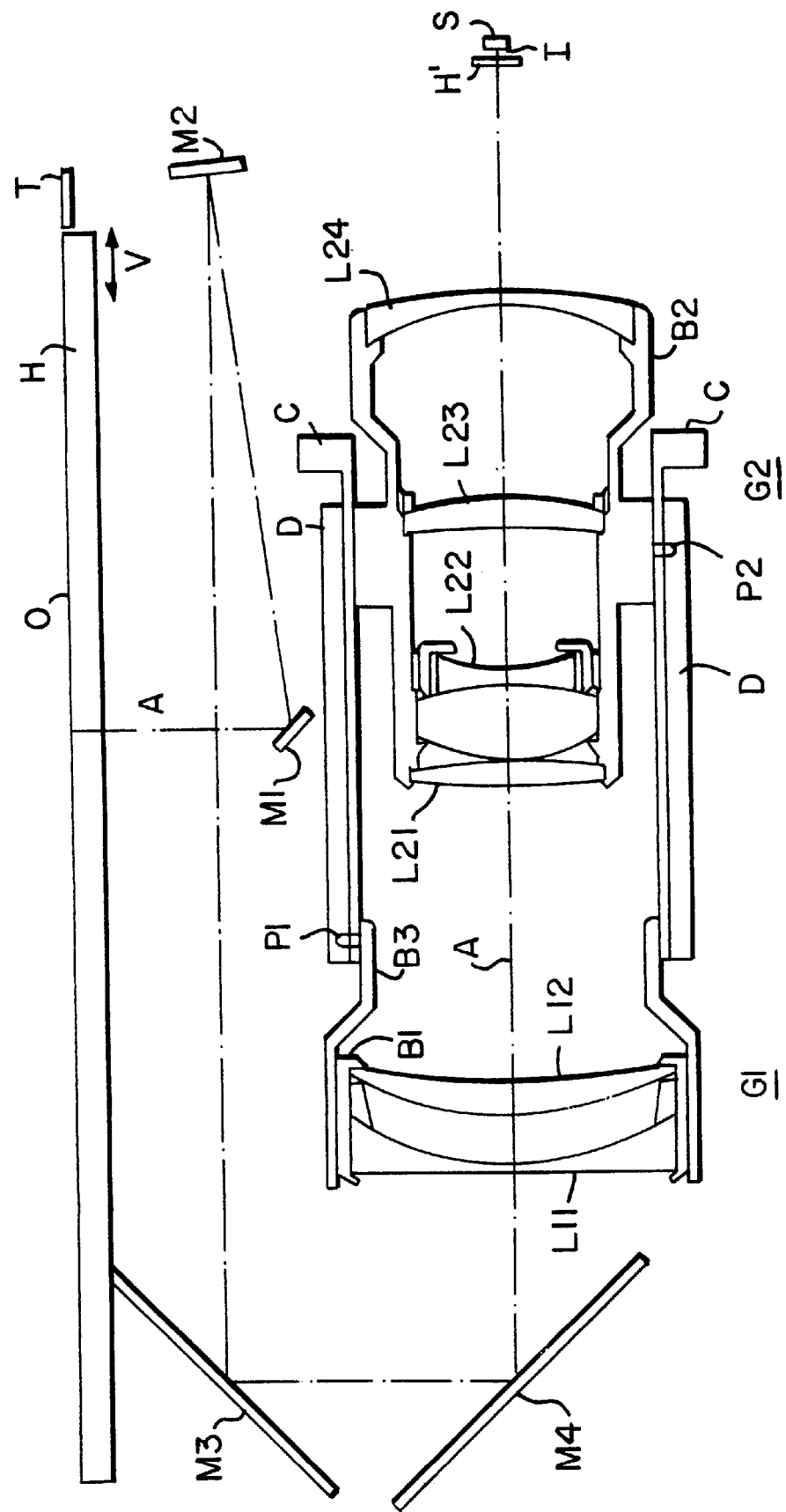
FIG. 1 is a side diagrammatic view of a structure of a document optical scanning system of a first embodiment of the present invention.

The changing magnification operation is that a given movable lens group is driven in the optical axis direction by a changing magnification driving system so that focal length varies. There are two generally known methods for the driving method.

In the first method a shifting ratio is recorded of each lens group on a cam orbit and a given rotary amount is provided to a cam barrel. In this manner each lens group is driven from a reference position to a given lens position.

In the second method the driving distance of each lens group between the reference position and the given lens position is calculated. Then each lens group is driven by the calculated distance.

In the case of the first method, the moving trail of each lens group is mechanically recorded as a cam orbit (locus). In the case of the second method, the moving trail of each lens is electrically recorded as an arithmetical formula.

On the other hand, the focusing operation drives the given lens group in the optical axis direction via a focus driving system to compensate for fluctuations in the image surface. The fluctuations in the image surface are caused by deviations in the document position in the optical axis direction, deviations in the length of the optical path during manufacturing, deviations in the stopping position of the lenses and the like.

In the method and apparatus incorporating the principles of the present invention, for example, by the use of a line sensor, in which photoelectric conversion devices are aligned in a straight line, as a light-receiving system, a document can be moved in the vertical direction in relation to the direction of the aligned photoelectric conversion devices, so that a document with a two-dimensional domain can be scanned. Also, by the use of a two-dimensional sensor in which photoelectric conversion devices are two-dimensionally arranged, as a light receiving system, a document with a two-dimensional domain can be scanned without sending it through the apparatus. As a light receiving system, for example, solid-state image pick-up devices, such as CCDs, can be used.

In the method and apparatus incorporating the principles of the present invention, the following operations are performed:

(1) lens position-setting operation;
(2) focus-adjusting operation;
(3) magnification-adjusting operation.

The lens position-setting operation of (1) is an operation corresponding to the previously mentioned changing magnification operation. In the lens position-setting operation, in other words, the movable lens group is driven in the optical axis direction from the reference position to the lens position corresponding to a given design scanning magnification which a user chooses.

The focus-adjusting operation of (2) moves the given lens group in the optical axis direction by a focus-adjusting amount. The changes in the image surface position are compensated. Then the document image position matches the position of the image pick-up surface. The fluctuations in the image surface position, as noted above, are caused by manufacturing errors, variations in origin detecting accuracy, lens-stopping accuracy, or environmental changes in temperature, humidity, and the like.

The magnification-adjusting operation of (3) drives each lens group in the optical axis direction by a given amount corresponding to scanning magnification errors in order to substantially match the actual scanning magnification of the optical scanning system and a given design scanning magnification chosen by a use.

In the method and apparatus incorporating the principles of the present invention, for example, a reference mark formed near the position where the document is located, is used for detecting the actual scanning magnification of the optical scanning system. This is based on an image of the reference mark formed via the optical scanning system. In this case, it is possible to detect the scanning magnification based on the size of the reference mark image formed on the image pick-up surface of the image pick-up device by the use of both the image pick-up surface on which the document image is formed and the detecting field which detects the reference mark image.

Specifically, for example, a reference mark comprising charts of a given size is formed near the supported surface of a document. Then, the actual scanning magnification of the optical scanning system can be detected based on the size of the chart image. Also, in the case that the size of a document is predetermined, the document itself can be used as a reference mark so that the actual scanning magnification of the optical scanning system can be determined based on the size of the document image. Furthermore, by the use of the chart image formed via projection optical system as a reference mark for example, the actual scanning magnification of the optical scanning system can be detected based on the size of the chart image (re-imaged) reformed on the image pick-up surface via the optical scanning system.

When a given spatial frequency component does not exist at a given position on the document, the focusing operation cannot be performed based on the document image. In this case, the focusing operation can be precisely performed based on the chart image comprising a given spatial frequency component formed on the image pick-up surface without depending on the document image. Or, the focusing operation can be performed by the use of a focusing chart of a given frequency component formed near the document position and having a given spatial relationship therewith.

Also, even if the document surface slides out of position in the optical axis direction, a chart image of a given size can be formed on the document by forming a projection optical system with a telecentric optical system in which light beams emitted onto the document surface are parallel to the optical axis of the optical scanning system.

Figure 2:
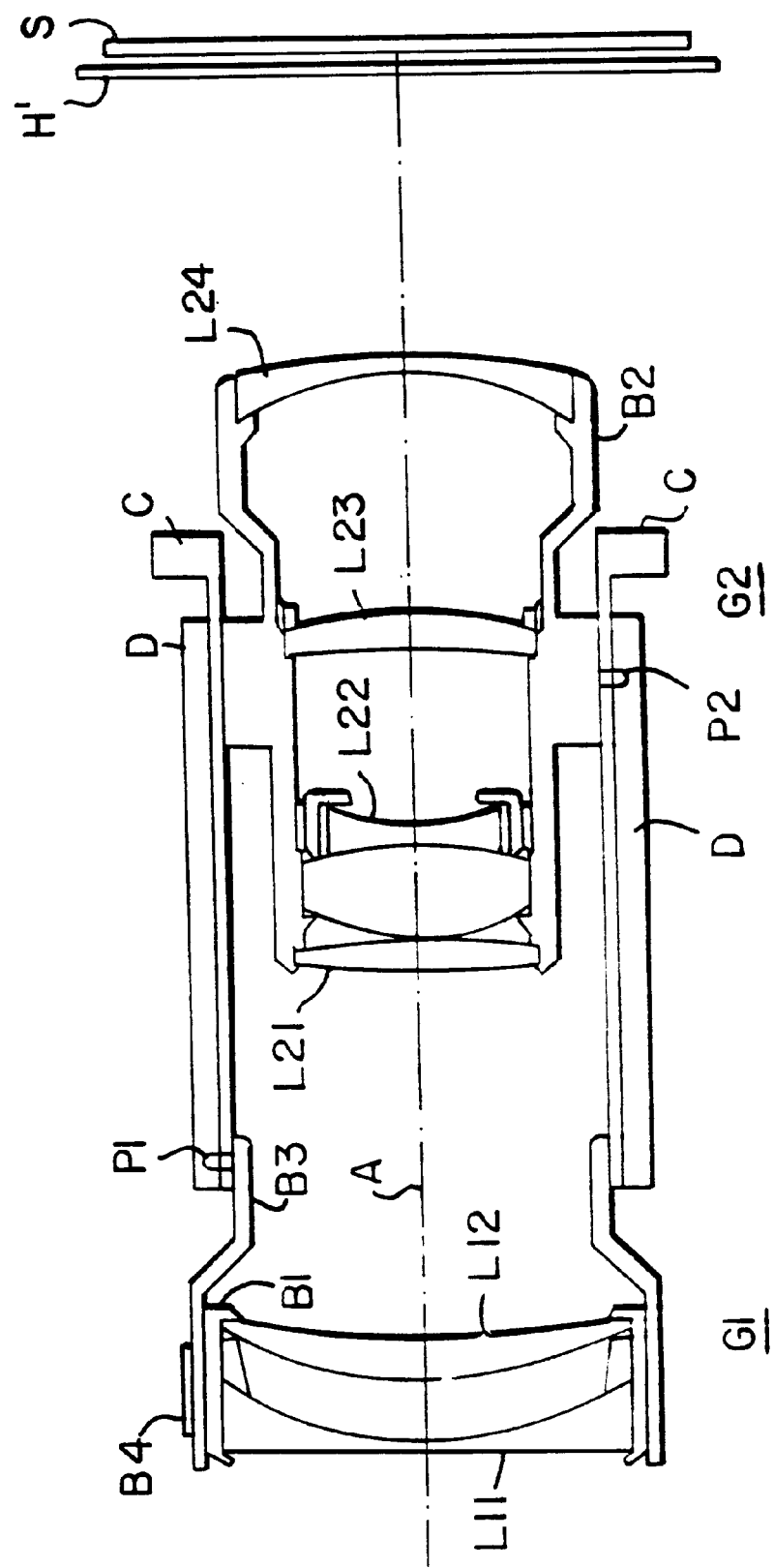
FIG. 2 is a cross-sectional view of the optical scanning system of FIG. 1 along a surface which includes optical axis A and which is perpendicular to the surface of the paper.

Referring to the drawings, FIG. 1 is a side diagrammatic view showing the structure of an optical scanning system of a first embodiment of the present invention. FIG. 2 is a cross-section of the optical scanning system of FIG. 1 along a surface which includes the optical axis A and which is perpendicular to the surface of the document. Also, FIG. 3 diagrammatically shows refraction positions of the optical scanning system of FIG. 1.

In the document scanning apparatus of FIG. 1, a scanned document (not shown) is positioned facing downward (on the upper surface) of protection glass H. Therefore, the upper surface of protection glass H forms a position where the document surface is to be positioned, that is, document position O. A light beam from the document enters the optical scanning system via reflective mirrors M1 through M4.

Figure 3:
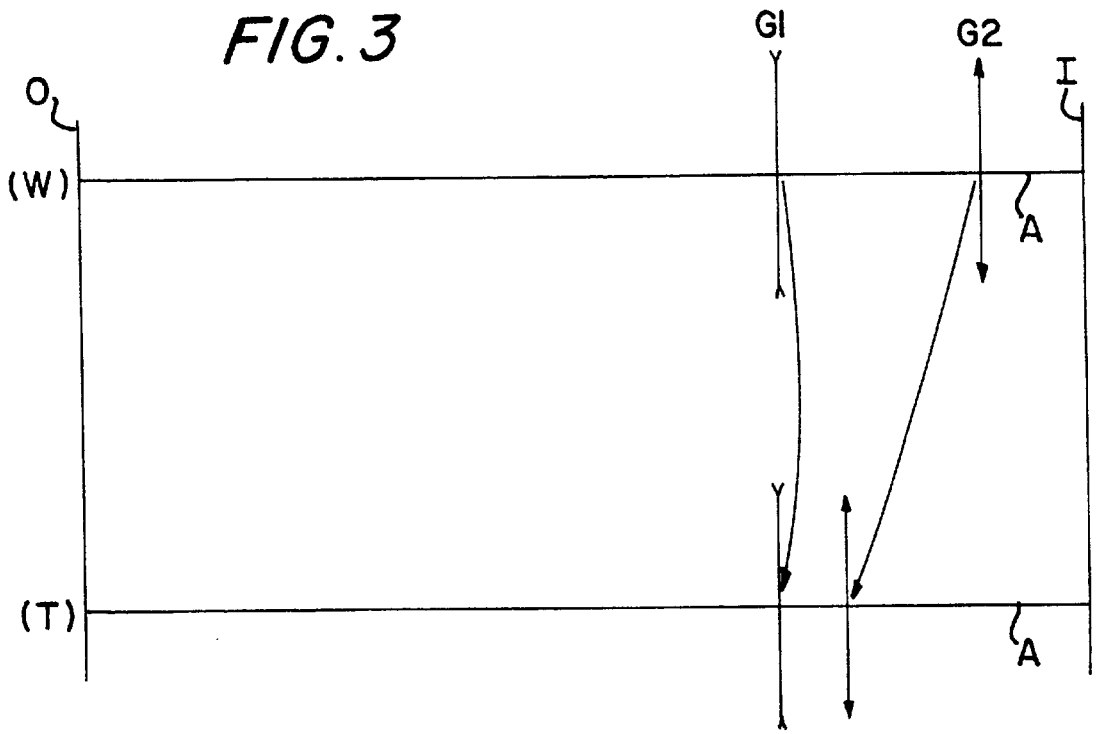
FIG. 3 is a diagram showing refraction positions of lenses in the optical scanning system of FIG. 1.

According to FIG. 3, the optical scanning system comprises, in order from the end of document position O, a first lens group G1 having negative refractive power and a second lens group G2 having positive refractive power. When the scanning magnification changes (or the focal position changes) from the minimum scanning magnification (minimum focal length state) shown as W in FIG. 3 to the maximum scanning magnification (maximum focal length state) shown as T in the figure, the second lens group G2 shifts along optical axis A toward document position O. In order to compensate for fluctuations in image position I caused by the shift of the second lens group G2, the first lens group G1 shifts along optical axis A.

According to FIGS. 1 and 2, in the optical scanning system, the first lens group G1 comprises, in order from the document side: negative meniscus lens L11 which has its convex surface facing the document side; and positive meniscus lens L12 which has its convex surface facing the document side.

Also, second lens group G2 comprises, in order from the document side: biconvex lens L21, cemented lens L22 having a biconvex lens and a biconcave lens; positive meniscus lens L23 which has its concave surface facing the document side; and negative meniscus lens L24 which has its concave surface facing the document side.

Negative meniscus lens L11 and positive meniscus lens L12 forming first lens group G1 are supported by a lens holder B1. Also, convex lens L21, cemented lens L22, positive meniscus lens L23, and negative meniscus lens L24 forming second lens group G2 are supported by lens holder B2. Lens holder B1 is supported by lens barrel B3 via a cam.

Cam barrel C is located outside lens holder B2 and lens barrel B3. Cam grooves are formed on cam barrel C in order to independently drive first lens group G1 and second lens group G2 along the optical axis A to change the scanning magnification. Also, straight barrel D is located outside cam barrel C. Barrel D is fixed when each lens (group is shifted for changing scanning magnification.

At the time of changing scanning magnification, cam barrel C is rotated by a motor (not illustrated) around optical axis A. At the same time, a follower pin P1, which projects out from the outer part of lens barrel B3, and follower pin P2, which projects out from the outer part of lens holder B2, are prevented from rotating due to a straight key (straight groove) formed on straight barrel D. As a result, the lens holders B2, B3 are driven in the optical axis direction along the cam grooves formed on cam barrel C. Consequently, first and second lens groups G1 and G2 are driven in the optical axis direction by a predetermined movement ratio.

When focusing, driving lever B4 (see FIG. 2) is rotated by a motor (not illustrated) different from the motor which rotates cam barrel C. Along with the rotation of driving lever B4, lens holder B1, which supports first lens group G1, is rotated. Then, lens holder B1 (in turn, first lens group G1) moves in the optical axis direction along the cam grooves formed on lens barrel B3.

Light beams from the document through the optical scanning, system structured as above forms a document image, via protection glass H' (see FIG. 1), on three CCD line sensors S, which are positioned at image surface position I. The protection glass H' and three CCD line sensors S are elongated in the direction perpendicular to FIG. 1. A color filter (not illustrated) is located right in front of the three CCD line sensors S. A document image based on light beams of R (red), G (green) and B (blue), which are separated via the color filter, is formed on each CCD line sensor. When the document is scanned, the entire block including the optical scanning system is driven in the direction shown by arrows V in FIG. 1 in relation to protection glass H.

As a consequence, a document with a two-dimensional domain can be scanned on one-dimensional CCD line sensors S. Chart T is formed as a reference mark at one end of protection glass H. Chart T (FIG. 1) is formed at the same level as the upper surface of protection glass H. When the whole block including the optical scanning system is moved in the direction shown as V in FIG. 1, an image of chart T is also formed on CCD line sensors S.

Also, three-line-color CCDs in which an RGB filter is formed on a chip can be substituted for the CCD line sensors.

The following Table 1 shows various values (lens data) of an optical scanning system of the first embodiment. In Table 1, surface numbers indicate the order of the lens surfaces from the document side in the direction of light beams. Also, refractive indices show values in relation to e line (λ=546.1 nm). Radius of curvature in Table 1 is a plane.

TABLE 1

| Surface Number | Radius of Curvature | Distance Between Surfaces | Refractive Index | Abbe Number | |
|---|---|---|---|---|---|
| 1 | ∞ | 3.000 | 1.51680 | 64.20 | (Protection Glass H) |
| 2 | ∞ | (D2 = Variable) | | | |
| 3 | 1064.7019 | 1.200 | 1.80399 | 42.34 | |
| 4 | 28.7149 | 5.000 | | | |
| 5 | 34.9182 | 3.400 | 1.74077 | 27.76 | |
| 6 | 96.7239 | (D6 = Variable) | | | |
| 7 | 70.8998 | 2.500 | 1.83500 | 42.97 | |
| 8 | −66.5781 | 0.100 | | | |
| 9 | 18.1075 | 7.200 | 1.49700 | 81.61 | |
| 10 | −38.7971 | 2.000 | 1.80610 | 33.27 | |
| 11 | 19.3643 | 1.700 | | | |
| 12 | ∞ | 12.000 | | | |
| 13 | −167.3676 | 3.000 | 1.74400 | 44.90 | |
| 14 | −29.4439 | 19.000 | | | |
| 15 | −24.6883 | 1.500 | 1.65160 | 58.44 | |
| 16 | −54.0223 | (D6 = Variable) | | | |
| 17 | ∞ | 0.700 | 1.51680 | 64.20 | (Protection Glass H') |
| 18 | ∞ | 1.200 | | | |

The following Table 2 shows variable distance, design scanning magnification β and effective F numbers at lens positions POS1 through POS4 corresponding to four representative design scanning magnifications of the optical scanning system of the first embodiment.

TABLE 2

| | POS 1 | POS 2 | POS 3 | POS 4 |
|---|---|---|---|---|
| Design Scanning Magnification β | −0.1890 | −0.2520 | −0.3150 | −0.3780 |
| Effective F Number | 5.30 | 6.32 | 7.27 | 8.18 |
| D 2 | 234.9551 | 239.9274 | 238.7441 | 235.0248 |
| D 6 | 22.5121 | 32.1266 | 41.1478 | 49.6688 |
| D 16 | 29.0329 | 14.4460 | 6.6082 | 1.8070 |

Figure 4:
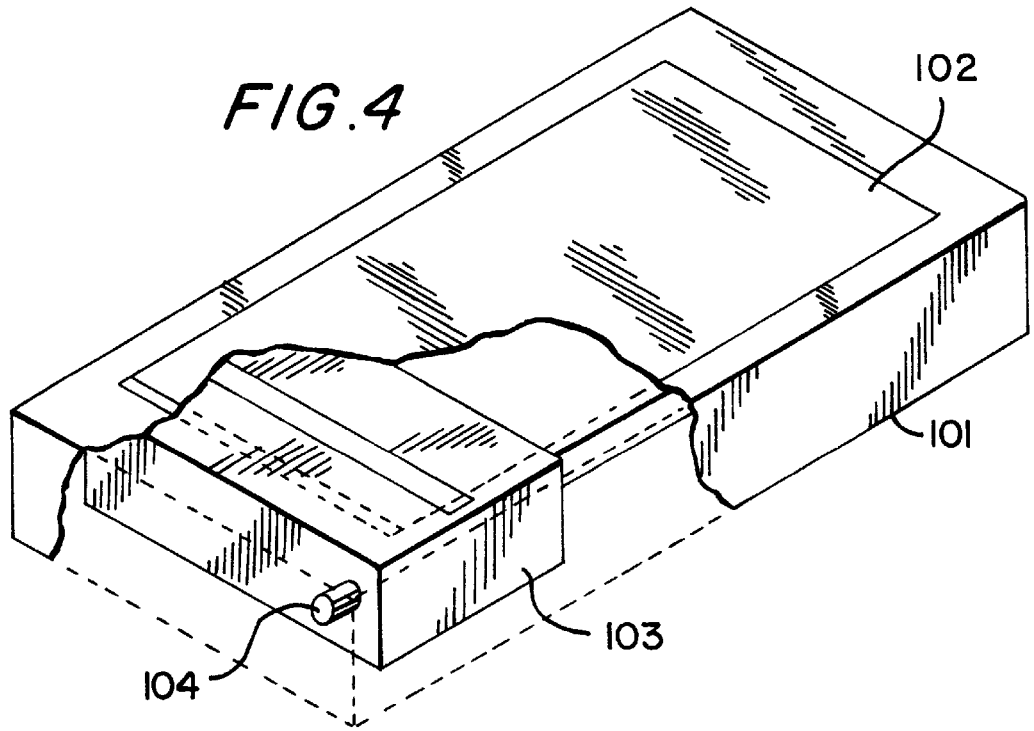
FIG. 4 is a perspective view, partially broken away, in which a document optical scanning system of the first embodiment is arranged as a flat-bed scanner.
Figure 5:
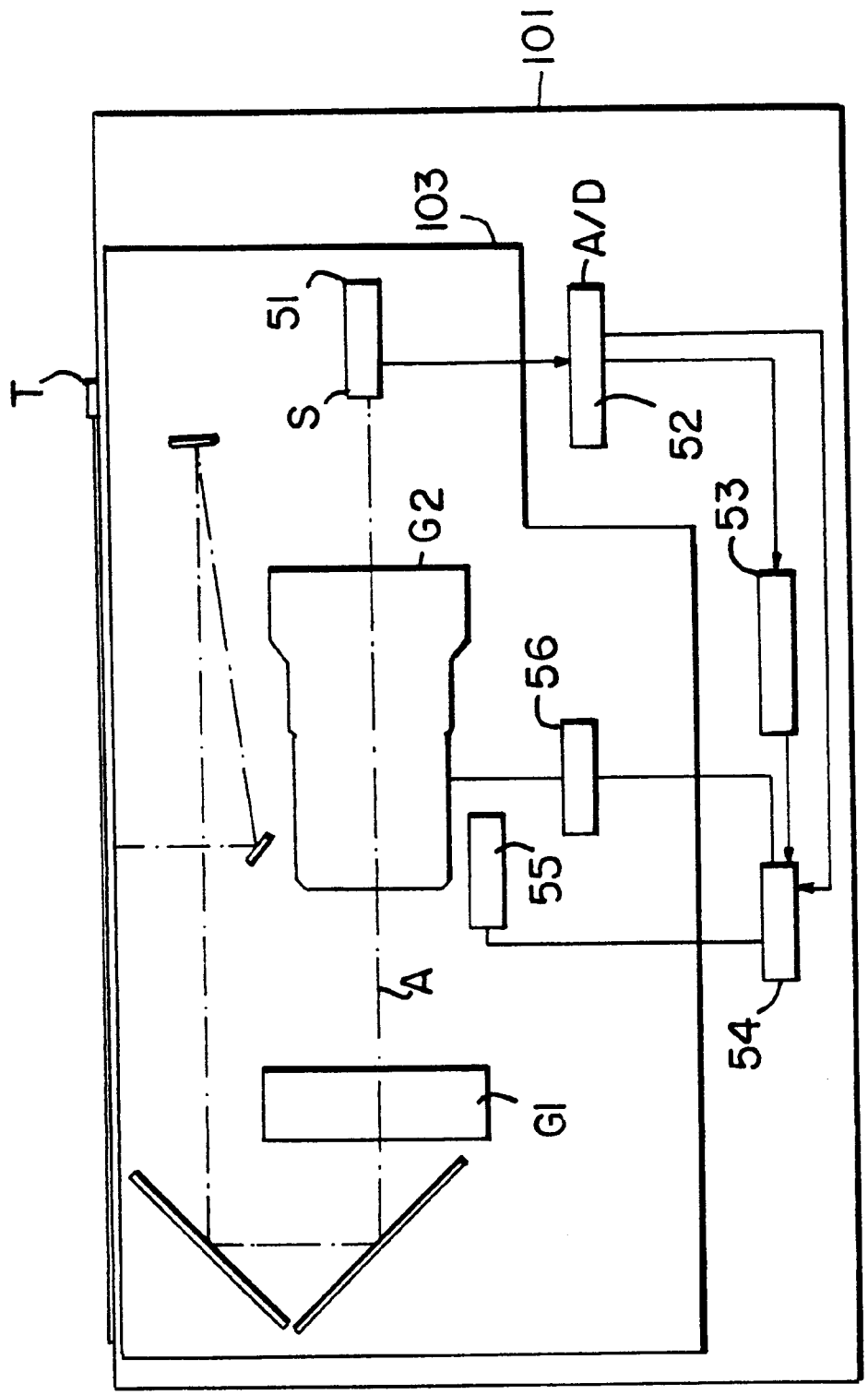
FIG. 5 is a diagrammatic view of a control mechanism for the optical scanner of FIG. 4.

FIG. 4 is a perspective view, partially broken away, in which an optical document scanning system of the first embodiment is built into a flat-bed type scanner. FIG. 5 shows a control mechanism of the scanner of FIG. 4.

Scanner body 101 of FIG. 4 includes the optical document scanning system 103 of the first embodiment. Optical document scanning system 103 is guided along a guiding rod 104 and moves relative to a document mounted on a document stage 102.

According to FIG. 5, analog signals of the document image emitted from a photoelectric conversion device 51 such as CCD line sensors S are converted into digital signals via an A/D converter 52, and then applied to magnification error detector 53. In magnification error detector 53, scanning magnification errors are detected based on the input signals applied thereto. The detected information relating to the scanning magnification errors is supplied to a main control system 54. Main control system 54 detects the reference position of cam barrel C via an origin detector 55, and also drives the first lens group G1 and the second lens group G2 in the optical axis direction via a driving system 56 such as a motor. In addition, the main control system 54 is controlled by an output from a host computer (not illustrated) which is positioned separate from the scanner body.

The illustrated first embodiment carries out a lens position-setting operation, a focus-adjusting operation, and a scanning magnification-adjusting operation in the following manner. In the first embodiment, each lens group is shifted to given lens positions by the lens position-setting operation. Thereafter, a focus-adjusting operation and a scanning magnification-adjusting operation are performed.

{1} Lens Position-Setting Operation

As mentioned above, in the lens position-setting operation, each lens group is shifted to given lens positions. In the following Table 3 is shown design scanning magnification β, the respective shifting amount δ1 and δ2 of the first and second lens groups G1 and G2 (shifting amount toward the document side is shown as positive) and rotational angle θ of cam barrel C at lens positions POS1 through POS4. In Table 3, shifting, amounts δ1 and δ2 and rotational angle θ at lens position POS1 are defined as zero.

TABLE 3

| | POS 1 | POS 2 | POS 3 | POS 4 |
|---|---|---|---|---|
| Design Scanning Magnification β | −0.1890 | −0.2520 | −0.3150 | −0.3690 |
| θ | 0.0000 | 19.2480 | 37.2828 | 52.0000 |
| δ1 | 0.0000 | −4.9560 | −3.7586 | −0.6423 |
| δ2 | 0.0000 | 9.6240 | 18.6414 | 26.0000 |

At lens positions POS1 through POS3, each lens group is shifted to lens positions corresponding to a given design scanning magnification. At the fourth lens position POS4, on the other hand, there is a possibility that first lens group G and second lens group G2 may interfere with each other during the focus-adjusting operation and the scanning magnification-adjusting operation described below. Therefore, at the fourth lens position POS4, each lens group is driven to lens positions in which the distance between first lens group G1 and second lens group G2 becomes large, that is, lens positions corresponding to a given scanning magnification which is slightly smaller than the given design scanning magnification.

{2} Focus-Adjusting Operation

The shifting amount δF of the first lens group G1 is detected at the condition in which contrast in the image of chart T formed on CCD line sensors S is at maximum. Then, the first lens group G1 is shifted in the optical axis direction by the detected focusing shifting amount δF.

{3} Scanning Magnification-Adjusting Operation

After the focusing operation is completed, actual scanning magnification βR of the optical scanning system is detected based on the size of the image of chart T formed on CCD line sensors S. In this case, scanning magnification error y is expressed as the following Equation (1):

$$\gamma = \beta R/\beta S - 1 \quad (1)$$

wherein:
  βS is a given design scanning magnification chosen by a user;
  βR and βS are originally negative values; however, actual scanning magnification βR is detected as a positive value so that design scanning magnification βS must be handled as a positive value as well.

In order to adjust scanning magnification such that the actual scanning magnification of the optical scanning system substantially matches the design scanning magnification βS, it is necessary to rotate the cam barrel C by a given magnification-adjusting angle corresponding to scanning magnification error γ calculated in Equation (1). Magnification-adjusting angle θ1 of cam barrel C necessary for scanning magnification adjustment is expressed as the following Equation (2):

$$\theta 1 = \gamma / \alpha 1 \qquad (2)$$

wherein:

α1 is a coefficient which relates scanning magnification error γ to magnification-adjusting angle θ1.

The following Table 4 shows coefficient α1 at each of the lens positions POS1 through POS4.

TABLE 4

|    | POS 1    | POS 2    | POS 3    | POS 4    |
|----|----------|----------|----------|----------|
| α1 | 0.066782 | 0.053720 | 0.045612 | 0.040176 |

In the first embodiment, one thousand hypothetical lenses are assumed based on conditions as follows:

tolerance in radius of curvature of lens surfaces is ±0.5%;

tolerance in distance is ±0.03 mm; and tolerance in refractive index is ±0.0005.

Moreover, the lens position-setting operation, focus-adjusting operation, and scanning magnification-adjusting operation are performed on the assumption that:

origin detecting accuracy is ±0.1 mm; and lens group stopping accuracy is ±0.015 mm.

FIGS. 6 through 12 show distributions of scanning magnification errors and back focus errors in hypothetical operations in the first embodiment.

Figure 6:
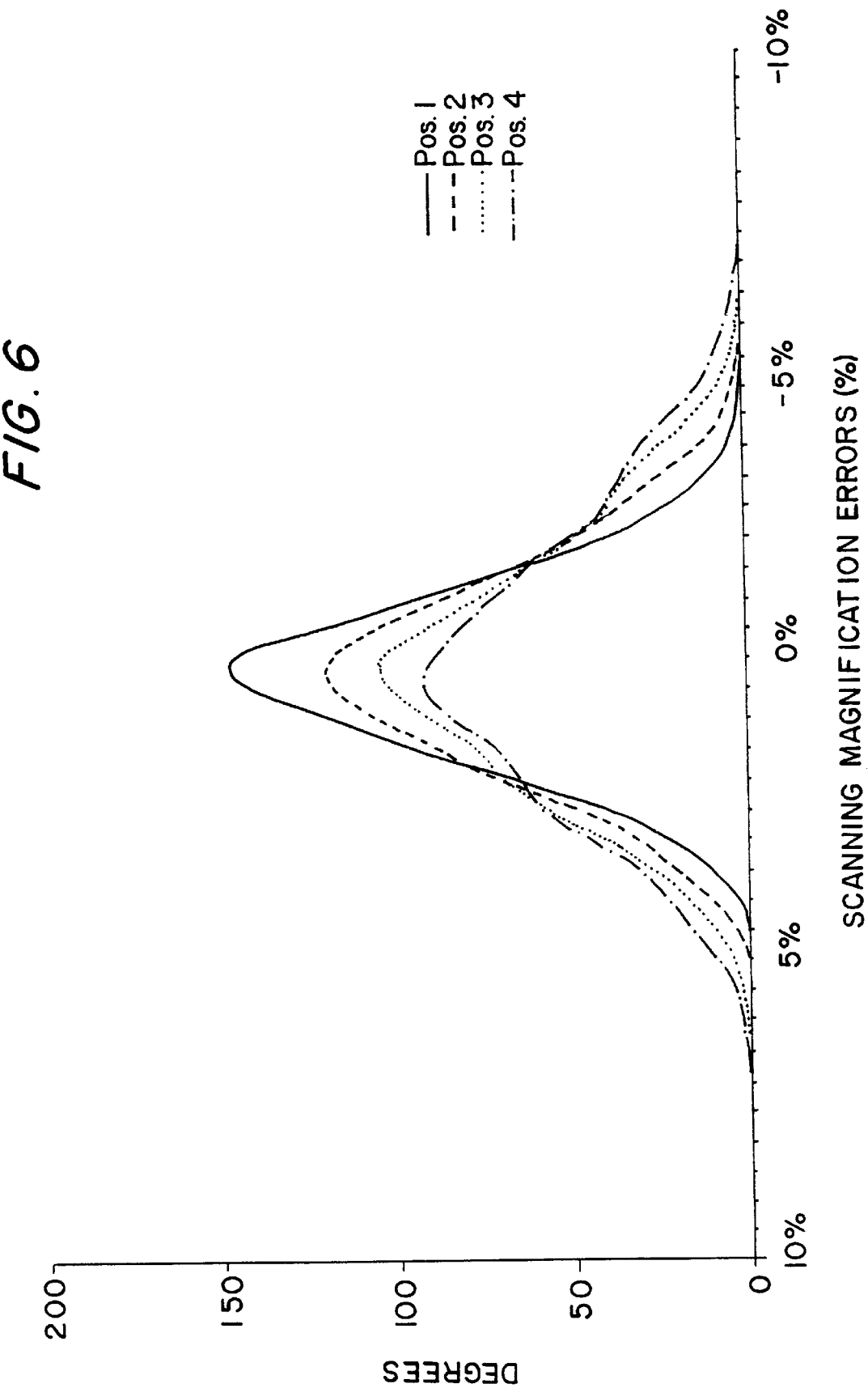
FIG. 6 is a graphical waveform showing the distribution of scanning magnification errors after the lens position-setting operation of the first embodiment.

FIG. 6 shows the distribution of the scanning magnification errors after the lens position-setting operation. In FIG. 6, the y-axis corresponds to degrees (number of hypothetical lenses), and the x-axis to scanning magnification errors (in percent).

Figure 7:
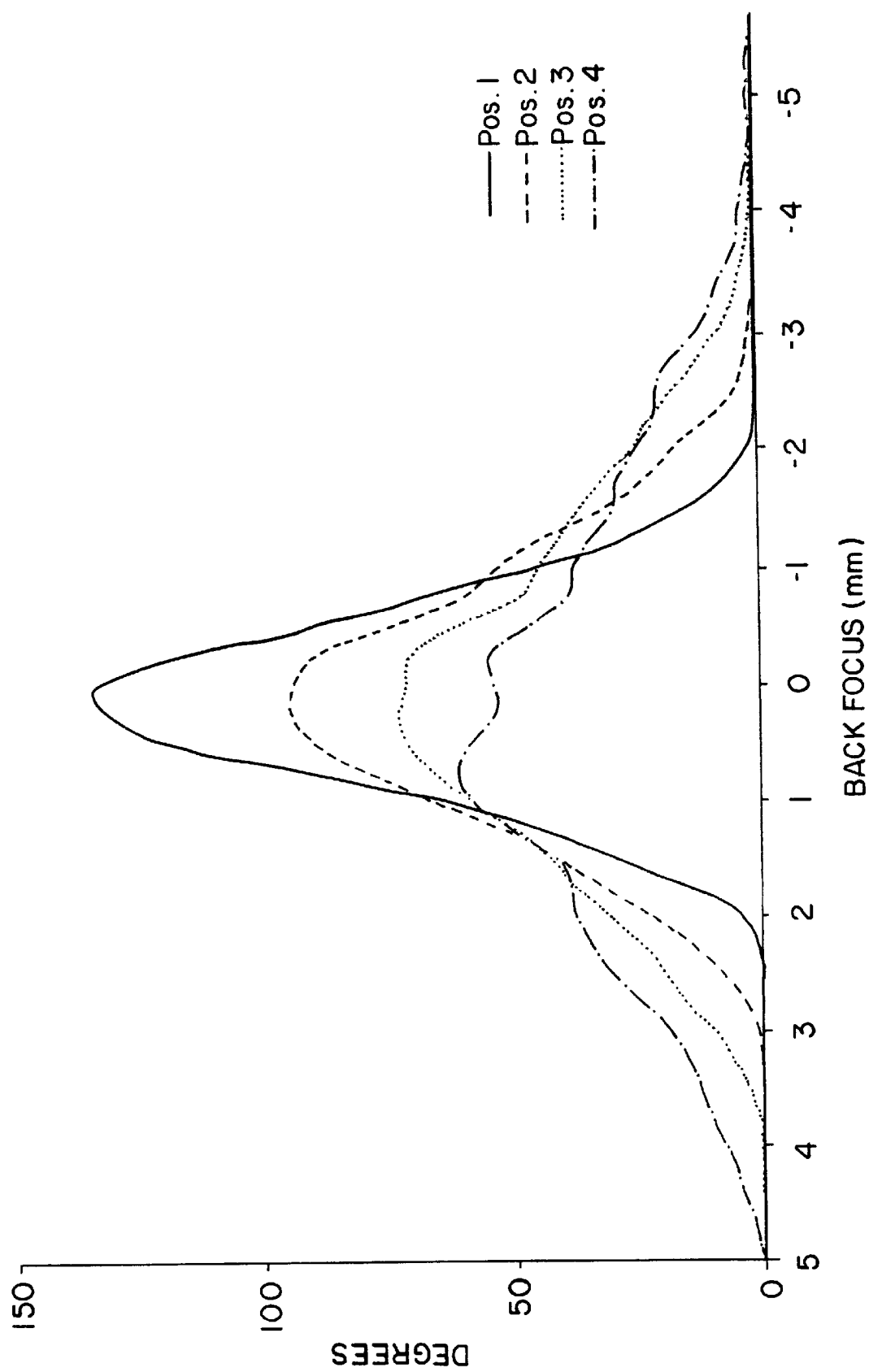
FIG. 7 is a graphical waveform showing the distribution of back focus errors after the lens position-setting operation of the first embodiment.

FIG. 7 shows the distribution of back focus errors after the lens position-setting operation. In FIG. 7, the y-axis corresponds to degrees, and the x-axis to back focus errors (in millimeters).

Figure 8:
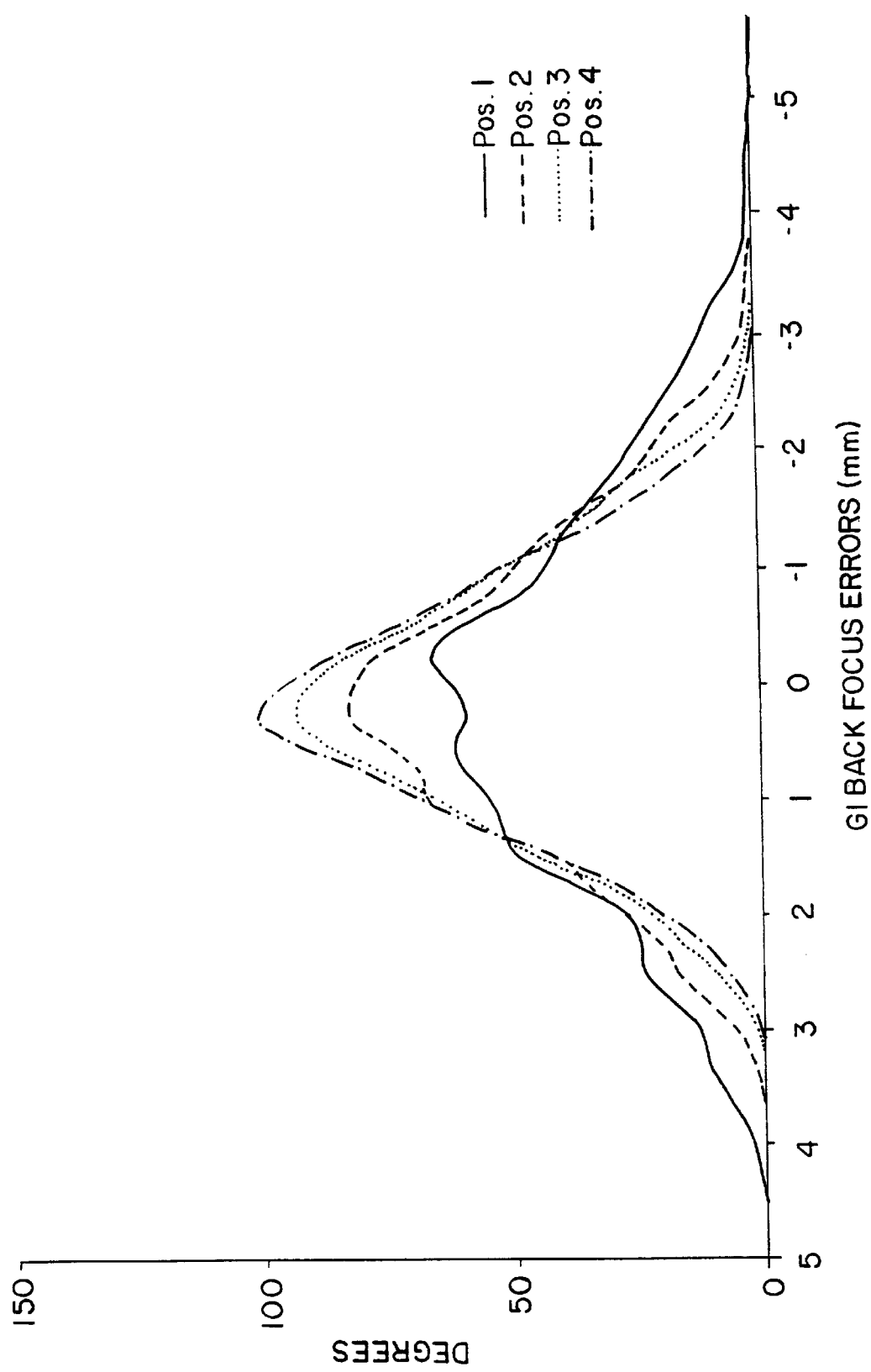
FIG. 8 is a graphical waveform showing the distribution of focusing shifting amount δF of first lens group G1 as a result of the focus-adjusting operation of the first embodiment.

FIG. 8 shows the distribution of focusing shifting amount δF of first lens group G1 as a result of the focus-adjusting operation. In FIG. 8, the y-axis corresponds to degrees, and the x-axis to focusing shifting amount of first lens group G1 (in millimeters).

Figure 9:
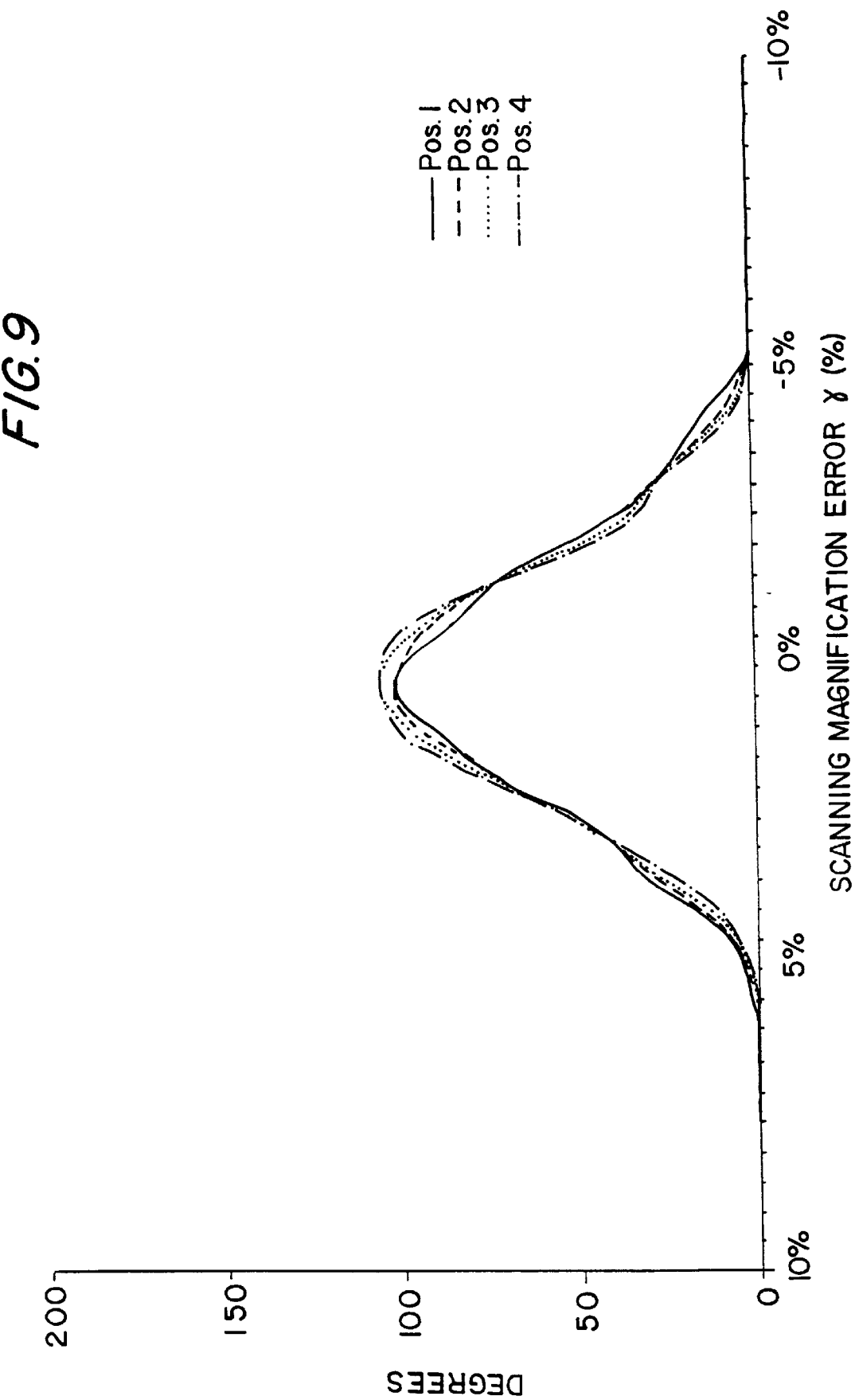
FIG. 9 is a graphical waveform showing the distribution of scanning magnification error γ after the focus-adjusting operation of the first embodiment.

FIG. 9 shows the distribution of scanning magnification error y after focus-adjusting operation. In FIG. 9, the y-axis corresponds to degrees, and the x-axis to scanning magnification error y (in percent).

Figure 10:
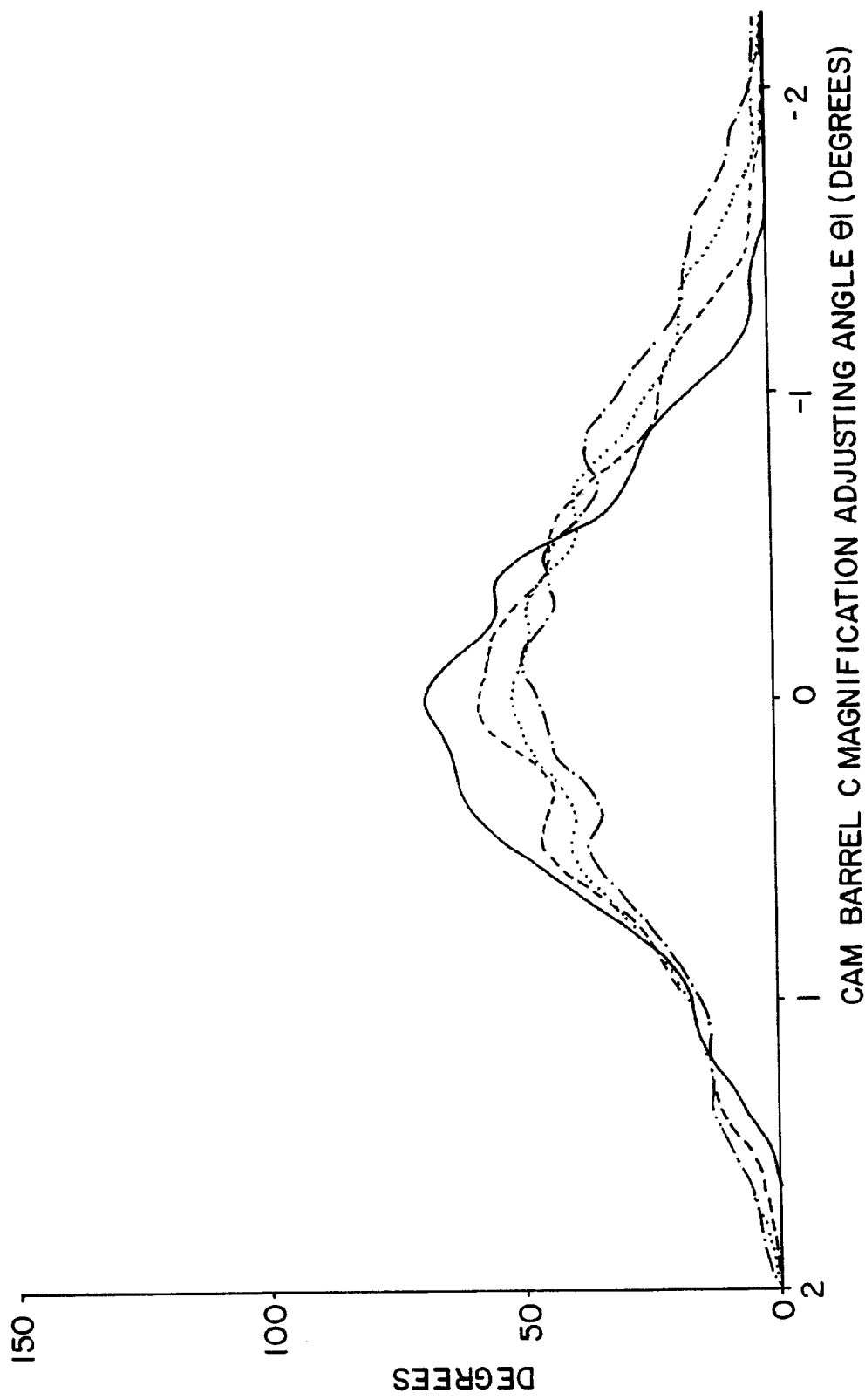
FIG. 10 is a graphical waveform showing the distribution of magnification-adjusting angle θ1 of cam barrel C after the scanning magnification-adjusting operation of the first embodiment.

FIG. 10 shows the distribution of magnification-adjusting angle θ1 of cam barrel C, after the scanning magnification-adjusting operation. In FIG. 10, the y-axis corresponds to degrees, and the x-axis to magnification-adjusting angle θ1 of cam barrel C, (in degrees).

Figure 11:
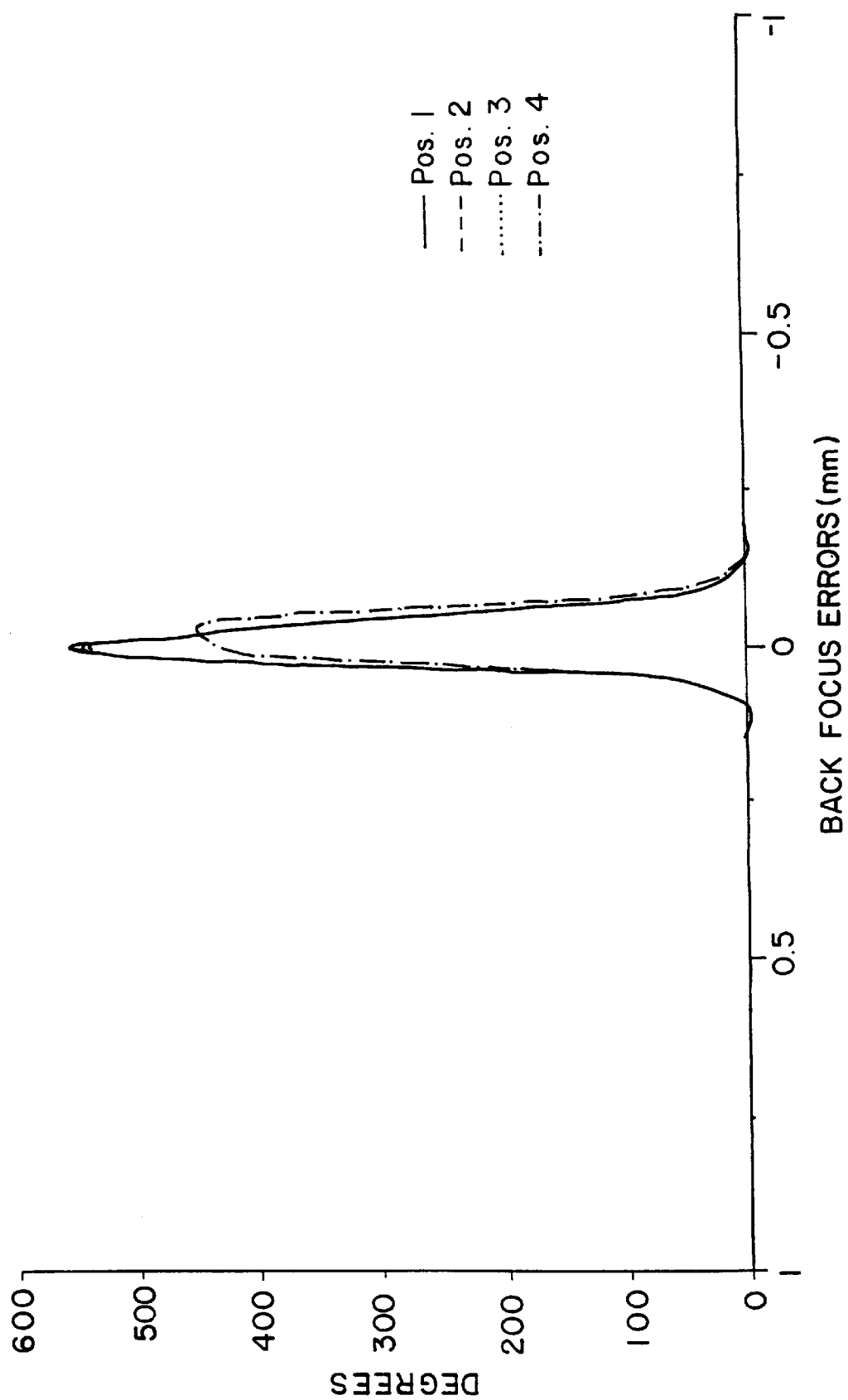
FIG. 11 is a graphical waveform showing the distribution of back focus errors after the scanning magnification-adjusting operation of the first embodiment.

FIG. 11 shows the distribution of back focus errors after the scanning magnification-adjusting operation. In FIG. 11, the y-axis corresponds to degrees, and the x-axis to back focus errors (in millimeters).

Figure 12:
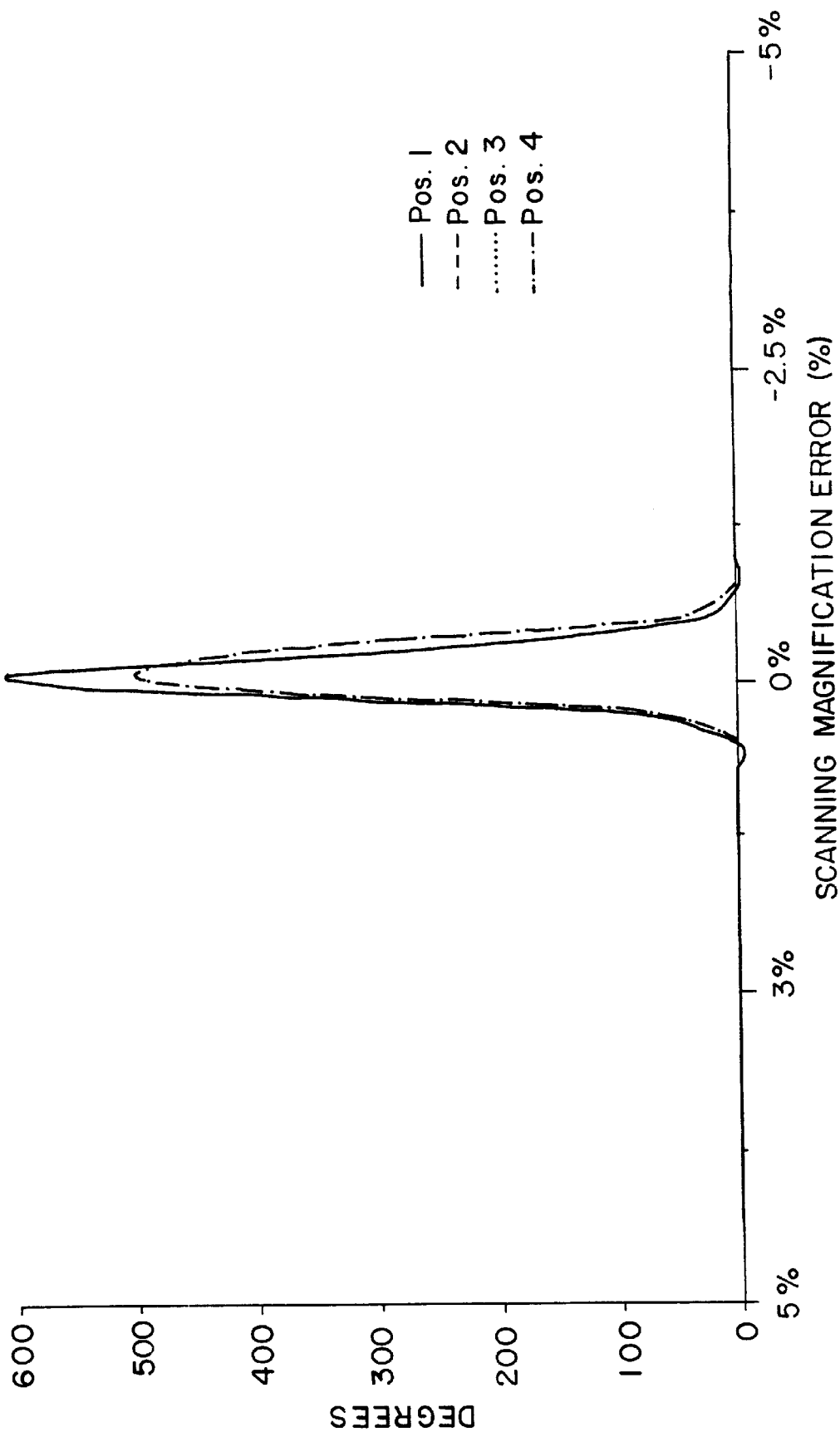
FIG. 12 is a graphical waveform showing the distribution of scanning magnification errors after the scanning magnification-adjusting operation of the first embodiment.

FIG. 12 shows the distribution of scanning magnification errors after the scanning magnification-adjusting operation. In FIG. 12, the y-axis corresponds to degrees, and the x-axis to scanning magnification error (in percent).

It is obvious from FIGS. 6 through 12 that in the first embodiment, scanning magnification errors and back focus errors after the scanning magnification-adjusting operation at each lens position can be minimized and that a document can be accurately scanned at a desired design scanning magnification in a preferable focusing condition.

Figure 13:
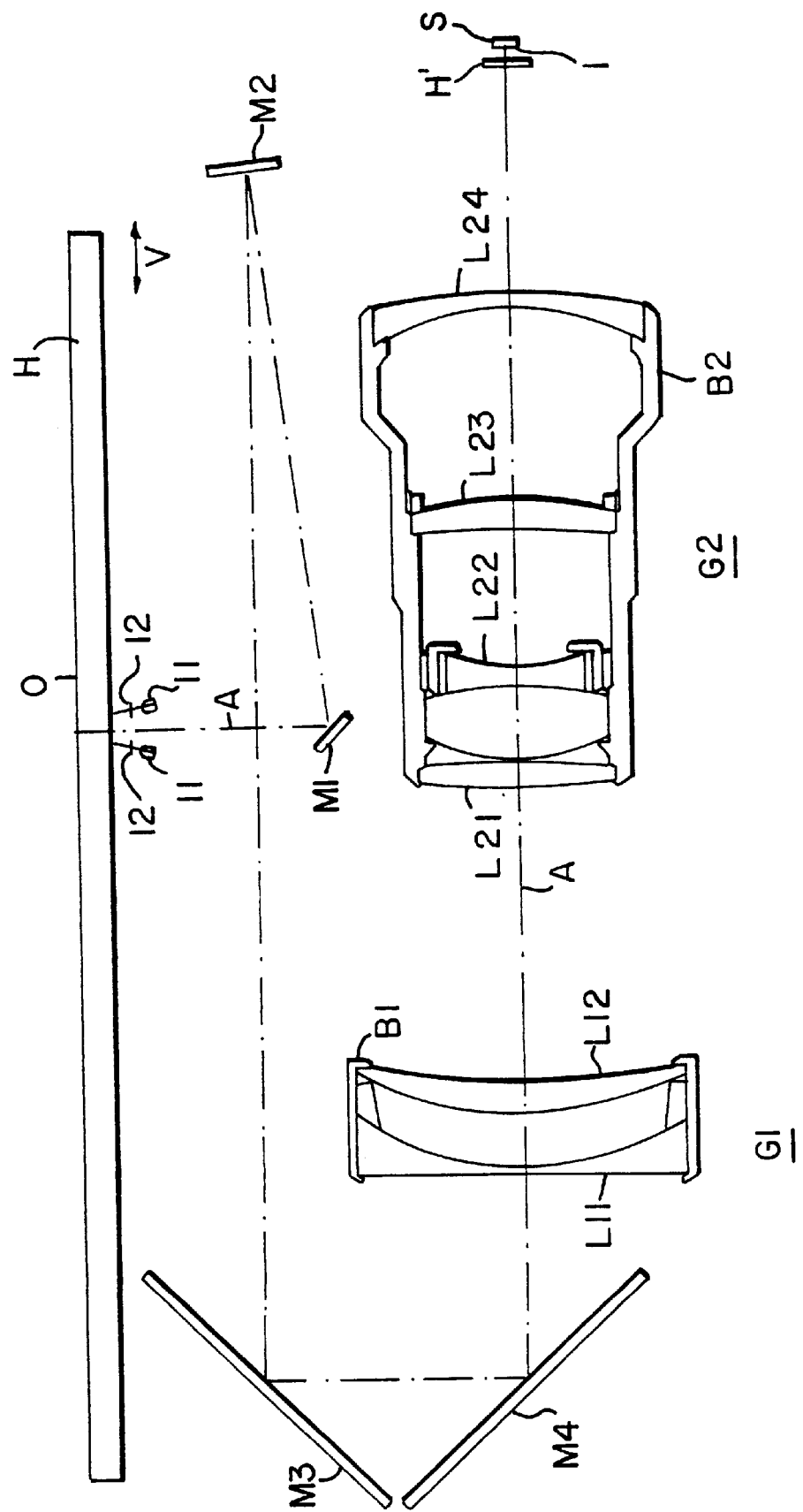
FIG. 13 is a side diagrammatical view of a structure of a document optical scanning apparatus according to a second embodiment of the present invention.

FIG. 13 schematically shows a structure of an optical document scanning apparatus according to the second embodiment of the present invention. Also, FIG. 14 is a perspective view of the optical scanning apparatus of FIG. 13 along a surface which includes optical axis A and which is perpendicular to the surface of the document.

The optical document scanning apparatus of the second embodiment comprises a structure similar to the first embodiment. Nonetheless, the second embodiment is different from the first embodiment in the following two ways:

the lens groups are driven by a feed screw; and a chart image is formed on a document surface as a reference mark for detecting scanning magnification.

Figure 14:
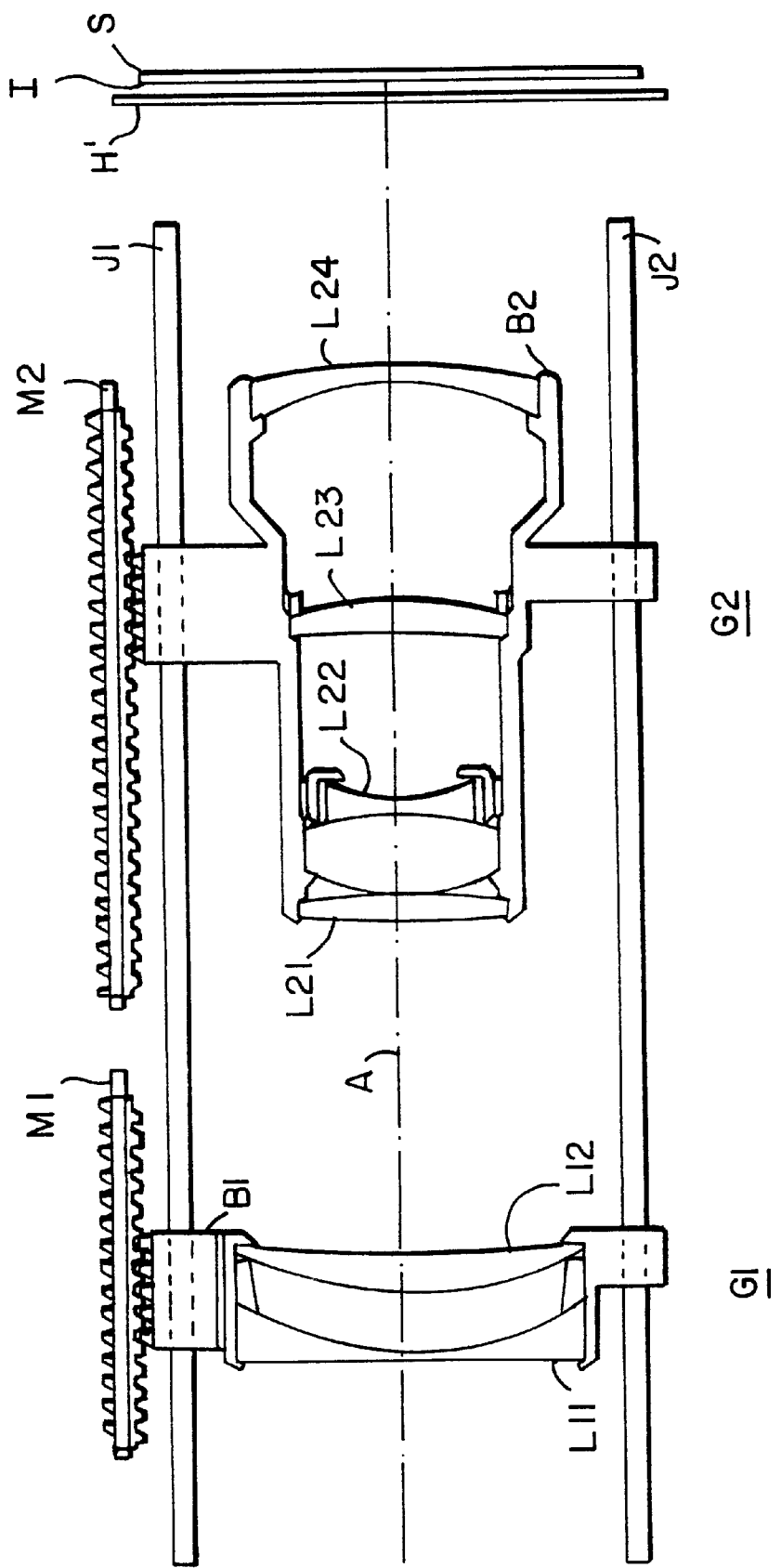
FIG. 14 is a cross-sectional view of the optical scanning apparatus of FIG. 13 along a surface which includes optical axis A and which is perpendicular to the surface of the paper.

Therefore, in FIGS. 13 and 14, all the components which perform the same functions as the components of the first embodiment are indicated with the same symbols as in FIGS. 1 and 2. The following explains the second embodiment considering the differences from the first embodiment.

In FIGS. 13 and 14, lens holder B1, which supports first lens group G1, and lens holder B2, which Supports second lens (group G2, are arranged such that they are movable along a pair of guiding rods J1 and J2 which are parallel to optical axis A. Also, a rack formed on the outer part of lens holder B1 engages feed screw M1, and a rack formed on the outer part of lens holder B2 engages feed screw M2. Therefore, when feed screws M1 and M2 are separately rotated by a pair of motors (not illustrated), lens holders B1 and B2, and in turn first lens group G1 and second lens group G2, are independently shifted in the optical axis direction. The distances that first lens group G1 and second lens group G2 move from their original respective positions are constantly recorded.

Figure 15:
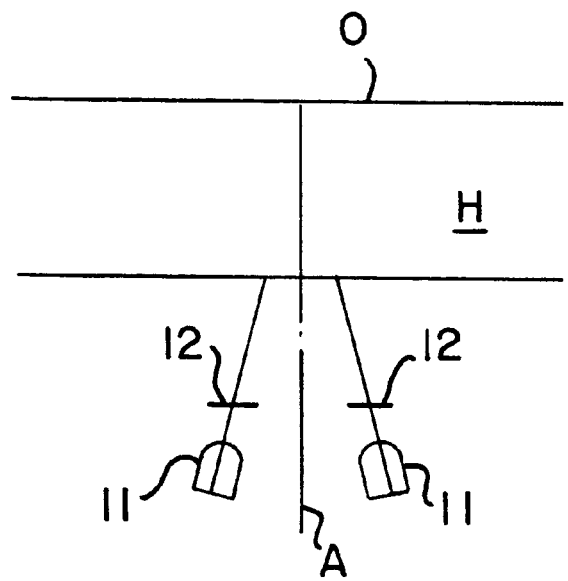
FIG. 15 is an enlarged view of a structure used in the projection optical system of FIG. 13.
Figure 16:
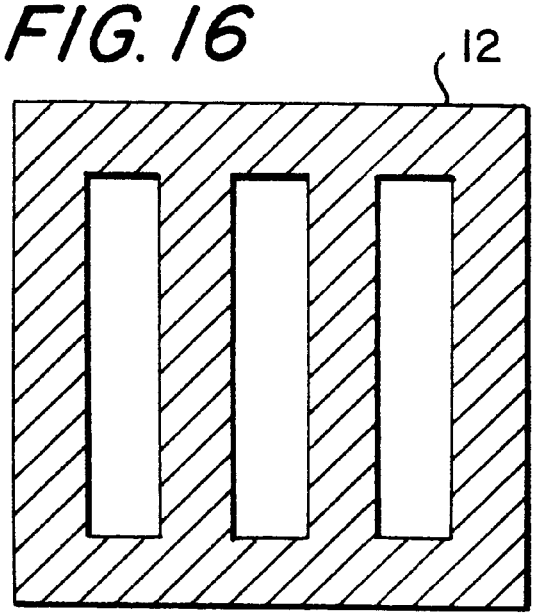
FIG. 16 is a pattern of a chart shown in FIG. 15.

As illustrated in FIG. 13, the optical document scanning apparatus of the second embodiment includes four projection optical systems to project a chart image on the document surface. FIG. 15 is an enlarged diagram of a structure utilized by the projection optical system of FIG. 13. As shown in FIG. 15, each projection optical system consists of an LED 11 and a chart 12. Also, the four projection optical systems are symmetrically arranged in relation to optical axis A so that they do not interfere with the optical path of the optical scanning system. In other words, only two projection optical systems are shown in FIG. 15. However, two more projection optical systems are positioned symmetrically in relation to optical axis A in the direction perpendicular to the pace of the Figure. For the chart 12, for example, a chart pattern which has a line and space pattern as shown in FIG. 16 can be used. Light beams from the chart image formed on the document surface via the four projection optical systems produce a chart image on CCD line sensors S via the optical scanning system.

In the second embodiment, after each lens group is shifted to a respective given lens position by a lens positions-setting operation, a focus-adjusting operation and scanning magnification-adjusting operation are performed.

{1} Lens Position-Setting Operation

As mentioned above, in the lens position-setting operation, each lens group is shifted to a respective given lens position. In the following Table 5, design-scanning magnification P and shifting amount δ1 and δ2 of first and second lens groups G1 and G2 (shifting amount toward the document side is shown as positive) at lens positions POS1 through POS4. In Table 5, shifting amount δ1 and δ2 and rotational angle θ at lens position POS1 are defined as zero.

TABLE 5

|  | POS 1 | POS 2 | POS 3 | POS 4 |
|---|---|---|---|---|
| Design Scanning Magnification β | −0.1890 | −0.2520 | −0.3150 | −0.3690 |
| δ1 | 0.0000 | −4.9560 | −3.7586 | −0.6423 |
| δ2 | 0.0000 | 9.6240 | 18.6414 | 26.0000 |

At lens positions POS1 through POS3, each lens group is shifted to a lens position corresponding to a given design-scanning magnification. At the fourth lens position POS4, on the other hand, there is a possibility that the first lens group G1 and the second lens group G2 may interfere with each other during the focus-adjusting operation and the scanning magnification-adjusting operation described below. Therefore, at the fourth lens position POS4, each lens group is driven to a respective lens position in which the distance between the first lens group G1 and the second lens group G2 becomes large, that is, lens positions corresponding to a given scanning magnification which is slightly smaller than the target design-scanning magnification.

{2} Focus-Adjusting Operation

Shifting amount δF of first lens group G1 is detected at the condition in which contrast in the image of chart 12 formed on CCD line sensors S is at a maximum. Then, the first lens group G1 is shifted in the optical axis direction by the detected focusing shifting amount δF.

{3} Scanning Magnification-Adjusting Operation

After the focusing operation is completed, actual scanning magnification βR of the optical scanning system is detected based on the size of the image of chart 12 formed on CCD line sensors S. In this case, scanning magnification error γ is calculated by the above-mentioned Equation (1).

In order to adjust scanning magnification such that actual scanning magnification of the optical scanning system matches design-scanning magnification βS, it is necessary to shift the first lens group G1 and the second group G2 by ΔG1 and ΔG2 respectively corresponding to scanning magnification error γ calculated in Equation (1). The amount ΔG1 of magnification adjustment shifting of the first lens group G1, (shifting toward the document side is shown as positive), and the amount ΔG2 of magnification adjustment shifting of the second lens group G2, (shifting toward the document side is shown as positive), necessary for adjusting the scanning magnification are expressed as the following Equations (3) and (4).

$$\Delta G2 = \gamma/\alpha 2 \quad (3)$$

$$\Delta G1 = \Delta G2/\alpha 3 = \gamma/(\alpha 2 \cdot \alpha 3) \quad (4)$$

wherein:

α2 is the coefficient which relates the scanning magnification error γ and the amount of magnification adjustment shifting ΔG2; and α3 is the ratio of the amount ΔG2 of magnification adjustment shifting to the amount ΔG1 of magnification adjustment shifting.

The following Table 6 shows the coefficient α2 and the ratio α3 at each of the lens positions POS1 through POS4.

TABLE 6

|  | POS 1 | POS 2 | POS 3 | POS 4 |
|---|---|---|---|---|
| α2 | 0.033391 | 0.026860 | 0.022806 | 0.020088 |
| α3 | −1.087 | −0.102 | 0.316 | 0.524 |

It is clear therefore that the apparatus incorporating the principles of the present invention as shown in the second embodiment, as well as the first embodiment, illustrate that scanning magnification errors and back focus errors can be minimized after the scanning magnification-adjusting operation at each lens position and that a document can be accurately scanned at a desired design scanning magnification in a preferable focusing condition.

The second embodiment can be modified so that a manufacturing process would include a chart comprising a given spatial frequency located at a document position; and the amount ΔG1 of magnification adjustment shifting, the amount ΔG2 of magnification adjustment shifting, and the amount δF of focusing shifting are detected and recorded, following the teachings of the second embodiment.

In actual use, a focus-adjusting, operation is performed in reference to a prerecorded focusing shifting amount δF. The focus-adjusting operation is performed based on a chart image formed on the document surface via a projection optical system, the same as in the second embodiment. Then, a scanning magnification-adjusting operation is performed based on prerecorded a magnification adjustment shifting amount ΔG1 and a magnification adjustment shifting amount ΔG2 and without the chart image formed on the document surface.

The modified embodiment does not require detection of scanning magnification by the use of a chart image. Therefore, in the modified embodiment which is different from the second embodiment having a pair of projection optical systems, only one projection optical system is located on the optical axis.

As described above, according to the principles of the present invention, scanning magnification is adjusted such that an actual scanning magnification detected in the use of the apparatus matches a given design-scanning magnification.

Therefore, scanning magnification errors and back focus errors can be minimized after the scanning magnification-adjusting operation at each lens position. Consequently, the method and apparatus incorporating the principles of the present invention permits a document to be accurately scanned at a desired design scanning magnification in a preferable focusing condition.

Various modifications will become possible for those skilled in the art after receiving the teachings of the present disclosure without departing from the scope thereof.

What is claimed is:

1. In an optical document scanning apparatus having a variable scanning magnification wherein an image of a document is formed on an image sensor, said apparatus comprising:

a plurality of lens groups, each lens group being capable of moving independently along an optical axis so as to change a scanning magnification along said optical axis and for receiving light beams from said document and focusing said beams on said image sensor;

a driving system for moving said lens groups along said optical axis to preselected lens positions corresponding to a given designed scanning magnification for said scanning apparatus; and a detector for detecting the actual scanning magnification of said scanning apparatus at said preselected lens positions, whereby said driving system moves each of said lens groups by an amount corresponding to the difference between the detected actual scanning magnification and said given designed scanning magnification.

2. Apparatus, as claimed in claim 1, wherein said scanning apparatus has a reference mark with a preselected spatial relationship with said document, said detector detecting said actual scanning magnification based on an image of said reference mark formed by said scanning apparatus.

3. Apparatus, as claimed in claim 2 wherein said detector detects said actual scanning magnification based on an image of said reference mark formed on said image sensor by means of said lens groups.

4. Apparatus, as claimed in claim 3, wherein said reference mark is an image projected on said document.

5. Apparatus, as claimed in claim 3, wherein said reference mark is formed near a supported surface of said document.

6. Apparatus, as claimed in claim 2, wherein said reference mark is an image projected on said document.

7. Apparatus, as claimed in claim 2, wherein said reference mark is formed near a supported surface of said document.

8. Apparatus, as claimed in claim 1, wherein said lens groups are rotatably mounted in lens holders and said lens groups are moved alone said optical axis when said lens holders are rotated.

9. Apparatus, as claimed in claim 8, wherein said lens holders are rotatably mounted in lens barrels and a cam barrel and said lens groups are moved along said optical axis when said cam barrel is rotated.

10. Apparatus, as claimed in claim 1, wherein said lens groups are mounted in lens holders, said holders respectively having racks on the outer surfaces thereof and said driving system for moving said lens groups includes feed screws respectively engaging said racks.

11. Apparatus, as claimed in claim 1, wherein said plurality of lens groups includes at least two lens groups separated by a preselected distance and said scanning magnification is varied by changing the distance between said two lens groups.

12. Apparatus, as claimed in claim 1, wherein said driving system independently moves each lens group of said plurality of lens groups.

13. A method for varying the scanning magnification of an optical document scanning apparatus wherein an image of a document is formed on an image sensor, said method comprising the steps of:

arranging a plurality of lens groups, each lens group being capable of moving independently along an optical axis so as to change a magnification of said scanning apparatus along said optical axis and for receiving light beams from said document and focusing said beams on said image sensor;

moving said lens groups along said optical axis to preselected lens positions corresponding to a given designed scanning magnification for said scanning apparatus;

detecting the actual scanning magnification of said scanning apparatus at said preselected lens positions;

determining any difference between the detected actual scanning magnification and said given designed scanning magnification; and moving each of said lens groups to new lens position determined by said difference.

14. A method, as claimed in claim 13, wherein said scanning apparatus has a reference mark and said step of determining said difference in scanning magnification includes focusing said reference mark on said image sensor.

15. A method, as claimed in claim 13, wherein said lens groups are moved to said new lens positions along said optical axis.

* * * * *